(12) United States Patent
Schröter

(10) Patent No.: US 11,920,716 B2
(45) Date of Patent: Mar. 5, 2024

(54) FLUID CONNECTOR

(71) Applicant: Fränkische Industrial Pipes GMBH & CO. KG, Königsberg (DE)

(72) Inventor: Dirk Schröter, Ebern (DE)

(73) Assignee: Fränkische Industrial Pipes GMBH & CO. KG, Königsberg (DE)

( * ) Notice: Subject to any disclaimer, the term of this patent is extended or adjusted under 35 U.S.C. 154(b) by 268 days.

(21) Appl. No.: 17/294,605

(22) PCT Filed: Nov. 22, 2019

(86) PCT No.: PCT/EP2019/082238
§ 371 (c)(1),
(2) Date: May 17, 2021

(87) PCT Pub. No.: WO2020/109165
PCT Pub. Date: Jun. 4, 2020

(65) Prior Publication Data
US 2022/0010905 A1    Jan. 13, 2022

(30) Foreign Application Priority Data
Nov. 28, 2018   (DE) ............... 10 2018 220 521.3

(51) Int. Cl.
F16L 37/098    (2006.01)
(52) U.S. Cl.
CPC ............... F16L 37/0985 (2013.01)
(58) Field of Classification Search
CPC .................. F16L 37/098; F16L 37/0985
See application file for complete search history.

(56) References Cited

U.S. PATENT DOCUMENTS

| 5,499,848 | A | 3/1996 | Kujawski |
| 10,047,889 | B2 | 8/2018 | Chaupin et al. |
| 10,247,340 | B2* | 4/2019 | Arnold ............... F16L 37/0985 |
| 2004/0094956 | A1 | 5/2004 | Lacroix et al. |
| 2012/0211977 | A1 | 8/2012 | Callahan et al. |
| 2013/0127159 | A1* | 5/2013 | Honda ............... F16L 37/098 |

(Continued)

FOREIGN PATENT DOCUMENTS

| CN | 1502840 A | 6/2004 |
| CN | 102042452 A | 5/2011 |

(Continued)

OTHER PUBLICATIONS

Chinese Application No. CN201980078432.5, "Office Action", dated Jul. 21, 2022, 8 pages.

(Continued)

*Primary Examiner* — Zachary T Dragicevich
(74) *Attorney, Agent, or Firm* — Kilpatrick Townsend & Stockton LLP

(57) ABSTRACT

A fluid connector, comprising a first connector body, a second connector body and a latching body which is configured to connect the first connector body to the second connector body, the latching body having a first non-destructively non-releasable latching device and a second non-destructively releasable latching device, the latching body being configured to be pushed both onto a radially outer side of the first connector body and onto a radially outer side of the second connector body.

17 Claims, 3 Drawing Sheets

(56) References Cited

U.S. PATENT DOCUMENTS

| | | | |
|---|---|---|---|
| 2014/0353961 A1 | 12/2014 | Milhas et al. | |
| 2015/0145243 A1* | 5/2015 | Dude | F16L 37/0985 |
| 2016/0298800 A1 | 10/2016 | Gocha et al. | |
| 2017/0067588 A1 | 3/2017 | Chaupin et al. | |
| 2017/0152980 A1* | 6/2017 | Klein | F16L 37/0985 |
| 2018/0017197 A1* | 1/2018 | Meister | F16L 37/0985 |
| 2020/0149670 A1* | 5/2020 | Wehrmann | F16L 37/0985 |

FOREIGN PATENT DOCUMENTS

| | | |
|---|---|---|
| CN | 103075596 A | 5/2013 |
| CN | 104364572 A | 2/2015 |
| CN | 104981642 A | 10/2015 |
| CN | 105849452 A | 8/2016 |
| CN | 107620846 A | 1/2018 |
| DE | 19809313 C1 | 8/1999 |
| DE | 102012013305 A1 | 1/2014 |
| DE | 102014105165 A1 | 10/2015 |
| DE | 102014107655 A1 | 12/2015 |
| DE | 102016109051 A1 | 4/2017 |
| EP | 0280180 A2 | 8/1988 |
| EP | 0280180 A3 | 11/1988 |
| EP | 0961070 A2 | 12/1999 |
| EP | 0961070 A3 | 7/2000 |
| EP | 1422461 A1 | 5/2004 |
| EP | 2937614 A1 | 10/2015 |
| EP | 3077718 A1 | 10/2016 |
| NO | 9427077 A1 | 11/1994 |
| WO | 2007066675 A1 | 6/2007 |
| WO | 2012109231 A2 | 8/2012 |
| WO | 2015084782 A1 | 6/2015 |
| WO | 2018159201 A1 | 9/2018 |

OTHER PUBLICATIONS

European Application No. 19808744.7, "Office Action", dated May 2, 2023, 5 pages.

German Application No. DE102018220521.3, Search Report, dated Jan. 24, 2020, 7 pages.

International Application No. PCT/EP2019/081884, International Search Report and Written Opinion, dated Jan. 27, 2020, 10 pages.

International Application No. PCT/EP2019/082238, International Search Report and Written Opinion, dated Feb. 24, 2020, 12 pages.

German Application No. DE102018219932.9, Search Report, dated Jan. 22, 2020, 8 pages.

U.S. Appl. No. 17/293,334, "Non-Final Office Action", dated Jul. 6, 2023, 11 pages.

* cited by examiner

FLUID CONNECTOR

CROSS-REFERENCE TO RELATED APPLICATION

This application is a U.S. national phase of International Patent Application No. PCT/EP2019/082238 filed on Nov. 22, 2019, which claims priority to German Patent Application No. 10 2018 220 521.3, filed in Germany on Nov. 28, 2018. The entire contents of both applications are hereby incorporated herein by this reference.

TECHNICAL FIELD

The present invention relates to a fluid connector, comprising a first connector body for connecting the fluid connector to a first fluid line, a second connector body formed separately from the first connector body for connecting the fluid connector to a second fluid line, and a latching body which is configured to connect the first connector body to the second connector body.

BACKGROUND

The applicant has been successfully selling fluid connectors for connecting a first fluid line to a second fluid line for many years. At the same time, the problem has repeatedly arisen in some areas of application that an outer diameter of the fluid connector has taken up too much space to be arranged, for example, in very spatially limited areas of application, such as inside a tube or in pipe ducts of a vehicle, without reducing the cross-section available for conducting a fluid.

Therefore, the problem has arisen of providing a fluid connector which can combine a secure connection of fluid lines to each other with the requirement for a small installation space.

SUMMARY

This object is achieved according to the invention by a fluid connector of the type referred to at the outset, the latching body having a first latching device, which is configured to engage with a corresponding mating latching device on the first connector body and which is formed in such a manner that engagement of the first latching device with the corresponding mating latching device is non-destructively non-releasable, and a second latching device which is configured to engage with a corresponding mating latching device on the second connector body and which is formed in such a manner that engagement of the second latching device with the corresponding mating latching device is non-destructively releasable, the latching body being configured to be pushed both onto a radially outer side of the first connector body and onto a radially outer side of the second connector body to engage the two latching devices.

Due to the fact that the latching body communicates with the relevant connector body on an outer side thereof, i.e. snaps in, an outer diameter of the fluid connector can be reduced compared to customary fluid connectors without reducing a line cross-section arranged inside the fluid connector for conducting fluid. This is particularly advantageous as the line cross-sections are usually predetermined by the system and therefore cannot be reduced. Of course, if necessary, the line cross-section can also be increased compared to customary fluid connectors while the outer diameter remains the same.

A ratio of outer diameter of the fluid connector or of the latching body to the diameter available for conducting a fluid which can be achieved by the fluid connector according to the invention is in the range of 2:1 to 3:1, in particular about 2.5:1. Conceivable dimensions in this case are an outer diameter of the latching body of approx. 19 mm and a free diameter of the fluid line formed in the fluid connector of approx. 8 mm.

In a development of the present invention, the first latching device may have a first subgroup and a second subgroup of latching elements distributed on the latching body in the circumferential direction thereof, the first subgroup and the second subgroup being spaced apart from each other in a direction in which the latching body can be pushed onto the first connector body. The latching body can thus be connected to the first connector body via two in particular differently formed subgroups of latching elements. As a result, an arrangement of the latching body on the first connector body can be secured in an improved manner, for example, by comparison with an embodiment of the first latching device with only one group or kind of latching elements, against higher forces which act towards a separation of the latching body from the first connector body.

In this case, those latching elements of the two subgroups of latching elements, which first come into contact with the first connector body when latching body and first connector body are connected, and/or those latching elements of the mating latching device on the first connector body, which first come into contact with the latching body when latching body and first connector body are connected, are formed as recesses. In other words, the arrangement of recesses and projections which cooperate in each of the subgroups of latching elements can be selected such that the subgroup of latching elements of the latching body which is arranged adjacent to the end of the latching body with which the latching body is first pushed onto the first connector body and the subgroup of latching elements of the connector body which is arranged adjacent to the end of the connector body onto which the latching body is first pushed onto the first connector body are formed as recesses. This can make it easier to push the latching body onto the first connector body.

Advantageously, the second latching device may be formed as a releasable snap-in connection which has at least one latching element and at least one gripping surface, the snap-in connection being formed in such a manner that on displacing the at least one gripping surface radially inwards with respect to the latching body, the at least one latching element is displaced radially outwards. Thus, the second connector body can be pushed into the latching body until it engages with the second latching device and can be removed again from the latching body by pressing on the at least one gripping surface, as a result of which the second latching device disengages with the second connector body.

In this case, it is particularly conceivable that each latching element of the second latching device may be associated with a resilient bar which is delimited in the circumferential direction of the latching body by two recesses which extend over more than 80%, in particular over more than 90% of the length of the latching body along a direction in which the latching body can be pushed onto the first connector body. The resilient bar may be formed in an outer wall of the latching body, it being possible to form the two recesses delimiting the resilient bar as through holes.

The latching elements of one of the two subgroups of latching elements of the first latching device may be arranged adjacent to the recesses which delimit a respective resilient bar, in particular directly adjoining them. The latching elements may be arranged on a side of the recess which delimits the resilient bar, said side being opposite the resilient bar. In particular, in the region of such a latching element, the recess may merge from a recess extending parallel to a longitudinal central axis of the latching body into a recess extending orthogonally thereto, in particular in the circumferential direction.

In particular, a radially outer surface of a resilient bar is arranged on a substantially identical radial extension as an outer circumferential surface of the latching body. That is, an inner and/or outer surface limiting a respective resilient bar in the radial direction may be flush in the circumferential direction with an inner or outer wall of a portion of the latching body which is adjacent to the recesses delimiting the resilient bar.

The radially inner surface of a resilient bar may be connected to the respectively associated latching element via two substantially radially extending connecting walls, such that the inner surface of the resilient bar, the two connecting walls and the latching element form a box shape. Of course, this also applies to a direction parallel to a radial direction, i.e. a direction which has no intersection point with a longitudinal central axis. Such a construction may prevent torsion and thus, for example, incorrect engagement and/or unintentional disengagement of a latching element of the second latching device with the second connector body.

One gripping surface and one latching element each may also be connected to each other at the end of the latching body on which the respective latching element is arranged. A respective connection between gripping surface and latching element may permit pressure on the at least one gripping surface to be transmitted to the connected latching element such that an engagement of the second latching device may be released.

In this case, the connection between a gripping surface and a latching element, viewed in a sectional plane through all gripping surfaces and latching elements of the second latching device, may be substantially straight. A straight connection between gripping surface and latching element may permit better transmission of force in order to displace the corresponding latching element.

In particular, the connections between the gripping surfaces and the latching elements may form a diamond shape. This is, of course, based on the fact that the second latching device comprises two gripping surfaces and two latching elements.

In one embodiment of the fluid connector according to the invention, the first connector body and the second connector body may have a substantially identical internal diameter which forms a respective fluid passage. As a result, a flow characteristic of the fluid flowing through the fluid connector according to the invention may remain substantially unchanged compared to a flow characteristic of the fluid in the fluid line which is connected upstream to the fluid connector, in the region of an end of this fluid line.

At least the first connector body may have projections extending in a push-on direction of the latching body onto the first connector body and/or recesses which are configured to engage with mating portions of the latching body such that the latching body is at least rotationally non-displaceable with respect to the first connector body. It should be pointed out here that the term "non-displaceable" is intended to mean that substantial rotations, of more than 1° for example, can be prevented. A certain "tolerance", which in production engineering terms cannot be avoided with justifiable effort, is not understood as rotation here. For example, the projections and/or recesses of the first connector body may be formed as prongs, for example rectangular shaped, extending away from the end of the connector body. In one embodiment, recesses which are associated with one of the subgroups of the first latching device may be at least partially arranged in the projections at the same time to prevent rotation.

The latching body may further have a ring arranged radially on the inside and running concentric to the circumference of the latching body, the ring being configured, in a connected state of the first latching device of the latching body to the first connector body, to secure a seal arrangement, which is arranged on the first connector body, with respect to axial displacement in relation to the first connector body. The seal arrangement, for example, may comprise at least one O-ring, in particular two O-rings and a spacer element arranged between the O-rings.

Advantageously, one latching element in each case of the second subgroup of latching elements of the first latching device may be arranged at a similar position to a gripping surface of the second latching device in the circumferential direction of the latching body. This may ensure that operating the gripping surfaces, for example pressing the gripping surfaces radially inwards, does not simultaneously aid or cause disengagement of the second subgroup of latching elements of the first latching device between the first connector body and latching body.

BRIEF DESCRIPTION OF THE SEVERAL VIEWS OF THE DRAWINGS

The present invention is described below in greater detail based on embodiments with reference to the associated drawings. The drawings show:

FIG. 2b a lateral cross-sectional view of the fluid connector according to FIG. 2a.

DETAILED DESCRIPTION

Figure 1:
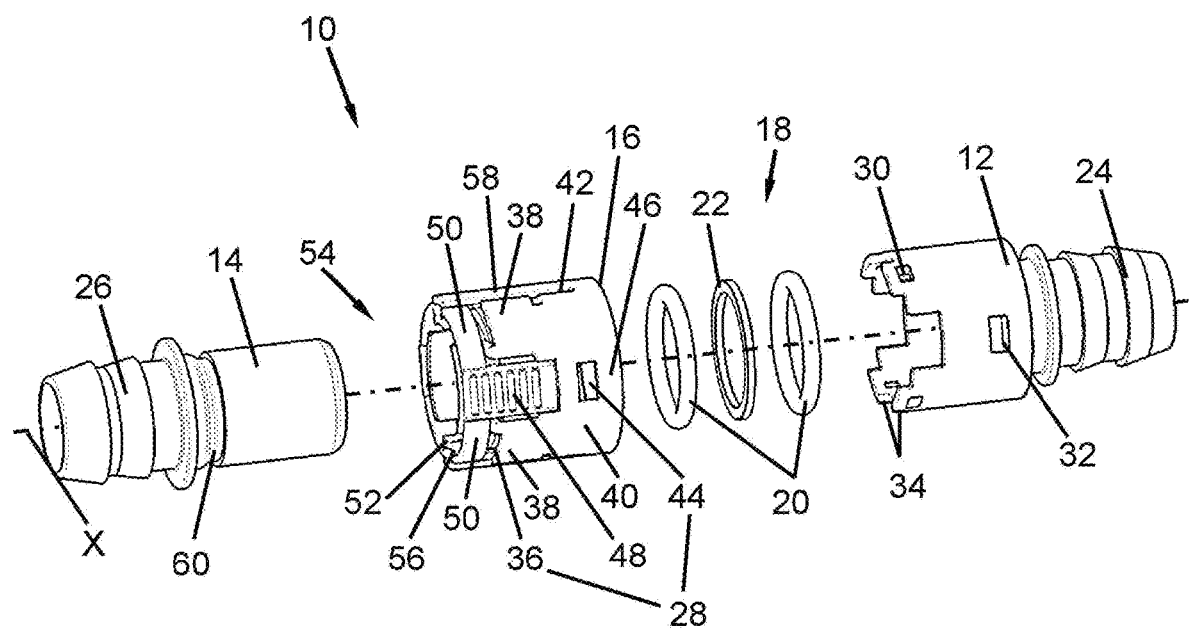
FIG. 1 a perspective exploded view of a first embodiment of a fluid connector according to the invention.

In FIG. 1, a fluid connector according to the invention is generally denoted by the reference number 10. The fluid connector 10 comprises a first connector body 12, a second connector body 14 and a latching body 16. The fluid connector 10 further comprises a seal arrangement 18 which here comprises two O-rings 20 and a spacer element 22.

The first connector body 12 and the second connector body 14 each have a connector portion 24 and 26 respectively to each of which a fluid line may be connected.

For connecting to the first connector body 12, the latching body 16 has a first latching device 28 which comprises a first and a second subgroup of latching elements which are described below for the purpose of easier understanding. Corresponding to the first latching device 28, the first connector body 12 has mating latching devices which in the embodiment of a fluid connector 10 according to the invention shown here in FIG. 1 are formed as latching elements 30 and latching elements 32. The latching elements 30 are formed here as four recesses which penetrate a wall of the first connector body 12. In this case, the latching elements 30 are arranged at least partially in the region of projections 34 which extend in a direction parallel to a longitudinal central axis X of the first connector body 12 and serve to secure the latching body 16 from rotating on the first connector body 12.

In this embodiment, the longitudinal central axis X at the same time forms a longitudinal central axis X of the second connector body 14 and the latching body 16 as well as an axis X, along which the first connector body 12 and the latching body 16 and the second connector body 14 and the latching body 16 respectively are connected to each other.

The recesses of the latching elements 30 engage with projections 36 of the first subgroup of the first latching device 28, said projections being arranged on the latching body 16, only two thereof being visible in FIG. 1, as soon as the latching body 16 has reached a corresponding position on the first connector body 12. Corresponding portions 38 of an outer wall 40 of the latching body 16, which are adjacent to the projections 36 radially on the outside, are exposed by corresponding recesses 42 through the wall 40 in such a manner that the portions 38 may be resiliently displaced radially outwards for displacing the latching body 16 with respect to the first connector body 12, when the projections 36 of the latching body 16 come into contact with the projections 34 of the first connector body 12.

The latching elements 32 are formed here as two projections extending radially outwards on the first connector body 12, of which only one can be seen in FIG. 1. The projections of the latching elements 32 engage at the corresponding relative position between latching body 16 and the first connector body 12 with recesses 44 of the second subgroup of latching elements of the first latching device 28, which here penetrate the wall 40 of the latching body 16. For this purpose, a portion 46 of the wall 40 of the latching body 16, which is arranged between a respective recess 44 and the end of the latching body 16 which is first pushed onto the first connector body 12, can be resiliently displaced radially outwards.

On the latching body 16, a gripping surface 48 can also be seen which, at the end of the latching body 16 which contacts the second connector body 14, is connected via two connectors 50 to one latching element 52 in each case of a second latching device 54. The latching elements 52 extend radially inwards on the latching body 16 and are each connected to a resilient bar 58 via two connecting walls 56 which run substantially radially. The resilient bar 58 is exposed from the wall 40 of the latching body 16 via the recesses 42, but is connected to the wall 40 of the latching body 16 at its end opposite the latching element 52, i.e. here it is integrally formed.

On the second connector body 14, a mating latching device 60 can be seen which is designed as a recess running in the circumferential direction of the connector body 14, said mating latching device being configured to engage with the second latching device 54 of the latching body 16. In this case, the second latching device 54 is formed in such a manner that the second connector body 14 may be pushed into the latching body 16 until engagement of the second latching device 54 with the mating latching device 60, without having to operate one or the gripping surfaces 48 of the latching body 16. For this purpose, at least one lead-in chamfer, which facilitates introduction and/or engagement of the second connector body 14 into or respectively with the latching body 16, may be provided on at least one from the second connector body 14, in particular at its end which is first pushed into the latching body 16, the second latching device 54, in particular the latching elements 52, and the mating latching device 60. However, if the gripping surfaces 48 are displaced towards the longitudinal central axis X of the latching body 16, the connectors 50 cause the latching elements 52 of the second latching device 54 to be displaced radially outwards and thus disengage with the mating latching device 60. In this manner, the second connector body 14 can be removed non-destructively from the latching body 16.

Figure 2A:
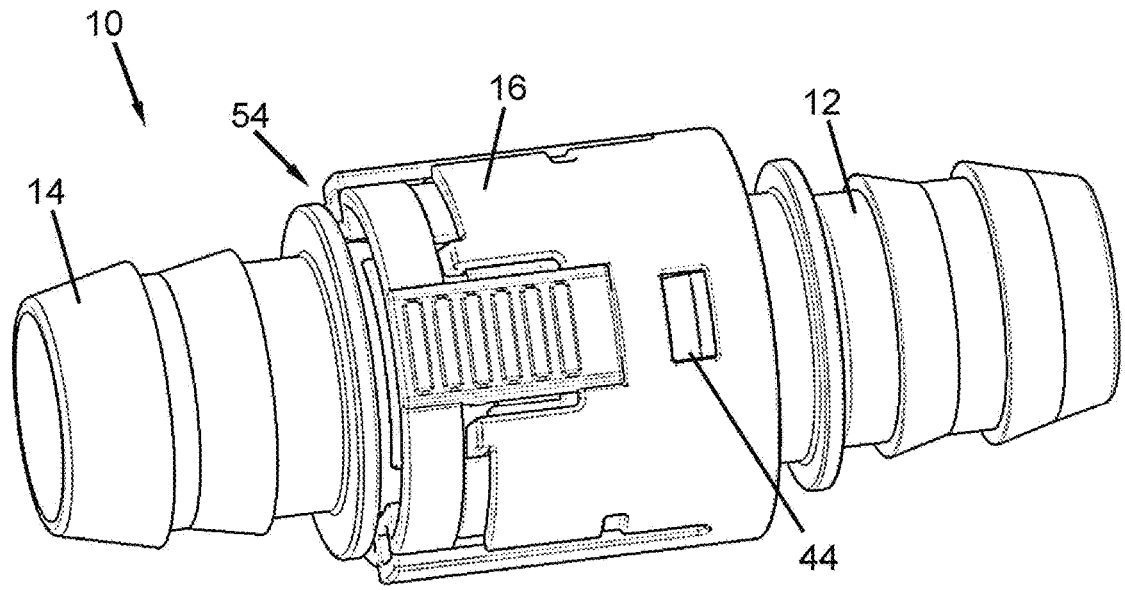
FIG. 2a a perspective view of the first embodiment according to FIG. 1 in an assembled state.

FIG. 2a shows the embodiment of the fluid connector 10 according to the invention shown in FIG. 1 in an assembled state. In this case, it can be seen from the example of the second subgroup of latching elements 44 of the first latching device 28 that the first latching device 28 of latching body 16 is engaged with the first connector body 12. It can also be seen that the second latching device 54 of the latching body 16 is engaged with the second connector body 14.

Figure 2B:
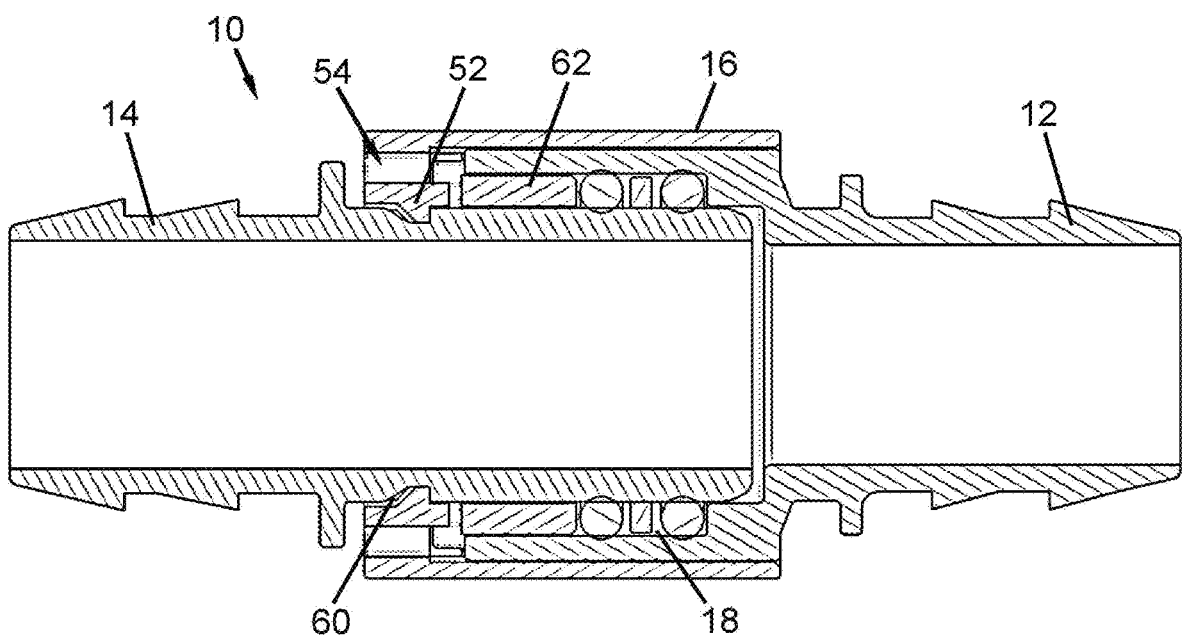

In the lateral cross-sectional view of FIG. 2b, which shows the assembled fluid connector 10 according to FIG. 2 in section, it can be seen how the latching elements 52 of the second latching device 54 of the latching body 16, which is connected to the first connector body 12, are engaged with the mating latching device 60 of the second connector body 14. It can also be seen in FIG. 2b that an inner ring 62 of the latching body 16 protrudes in the direction of the seal arrangement 18 in order to secure the seal arrangement 18 between the latching body 16 and the first connector body 12.

Figure 3:
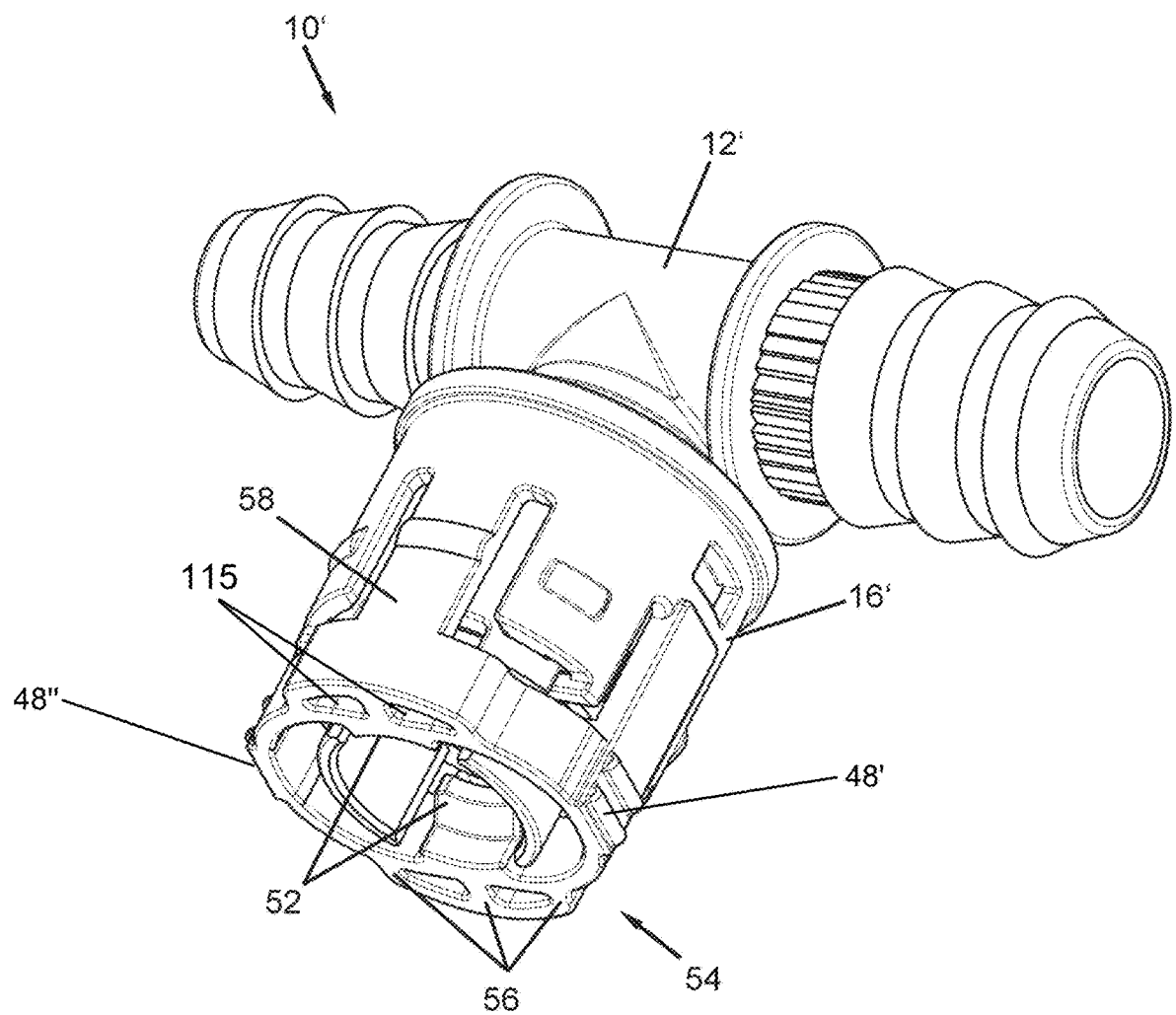
FIG. 3 a perspective view of a second embodiment of a fluid connector according to the invention.

FIG. 3 shows a second embodiment of a fluid connector 10' according to the invention which differs from the fluid connector 10 in particular in that a first connector body 12' defines inherently two fluid passages running in substantially opposite directions and thus forms a T-piece together with a second connector body 14 (not shown). Therefore, only differences between the fluid connector 10' and the fluid connector 10 will be dealt with below, it being explicitly pointed out that all advantages and features of the fluid connector 10 can also be used on the fluid connector 10' and vice versa. Thus, similar elements to the fluid connector 10 are denoted by the same reference numbers in FIG. 3.

The two fluid passages defined by the first connector body 12' may have diameters which differ from each other, such as 8 mm and 6 mm for example.

It can further be seen in FIG. 3 that, compared to the fluid connector 10, the latching elements 52 of the second latching device 54 are connected to their respective resilient bar 58 via a further connecting wall 56. A kind of double box shape thus emerges, such as at least one box shape 115. As a result, a connecting region of a connecting element 52 with a respective resilient bar 58 may be widened, in particular in the circumferential direction of a latching body 16', thereby increasing a rigidity of the latching element with respect to the latching body 16', in particular with respect to the resilient bar 58. In some cases, the latching body 16' includes multiple gripping surfaces 48' and 48".

The invention claimed is:
1. A fluid connector, comprising:
a first connector body for connecting the fluid connector to a first fluid line,
a second connector body formed separately from the first connector body for connecting the fluid connector to a second fluid line, and
a latching body which is configured to connect the first connector body to the second connector body,
wherein the latching body has a first latching device and a second latching device, the first latching device being configured to engage with a first mating latching device on the first connector body and which is formed in such a manner that engagement of the first latching device with the first mating latching device is non-destructively non-releasable, wherein the first latching device has first latching elements distributed on the latching body in a circumferential direction thereof, the second latching device being configured to engage with a second mating latching device on the second connector body and which is formed in such a manner that engagement of the second latching device with the second mating latching device is non-destructively releasable, wherein a second latching element of the second latching device is associated with a resilient bar which is delimited in the circumferential direction of the latching body by multiple recesses, wherein a first subgroup of the first latching elements of the first latching device are arranged adjacent to the multiple recesses which delimit a respective resilient bar, wherein the latching body is configured to be pushed onto both a radially outer side of the first connector body and onto a radially outer side of the second connector body to engage the first latching device and the second latching device.

2. The fluid connector according to claim 1,
wherein a second subgroup of the first latching elements is spaced apart from the first subgroup of the first latching elements in a direction in which the latching body can be pushed onto the first connector body.

3. The fluid connector according to claim 2,
wherein one or more particular latching elements of the second subgroup of the first latching elements, which first come into contact with the first connector body when the latching body and the first connector body are connected, are formed as additional recesses in the latching body.

4. The fluid connector according to claim 2,
wherein one or more particular latching elements of the first mating latching device on the first connector body, which first come into contact with the latching body when the latching body and the first connector body are connected, are formed as additional recesses in the first mating latching device.

5. The fluid connector according to claim 2,
wherein a particular latching element of the second subgroup of the first latching elements of the first latching device is arranged at a similar position to a gripping surface of the second latching device in the circumferential direction of the latching body.

6. The fluid connector according to claim 1,
wherein the second latching device is formed as a releasable snap-in connection which has the second latching element and at least one gripping surface of the second latching device, wherein the releasable snap-in connection is formed in such a manner that on displacing the at least one gripping surface radially inwards with respect to the latching body, the second latching element is displaced radially outwards.

7. The fluid connector according to claim 6,
wherein the at least one gripping surface and the second latching element each are connected to each other at an end of the latching body on which the second latching element is arranged.

8. The fluid connector according to claim 7,
wherein the connection between the at least one gripping surface and the second latching element, viewed in a sectional plane through additional gripping surfaces and additional second latching elements of the second latching device, is substantially straight.

9. The fluid connector according to claim 7,
wherein the second latching device further has an additional gripping surface and an additional second latching element that are further connected to each other at the end of the latching body on which the second latching element and the additional second latching element are arranged,
wherein the connections between the at least one gripping surface and the second latching element and further between the additional gripping surface and the additional second latching element form a diamond shape.

10. The fluid connector according to claim 6,
wherein the multiple recesses extend over more than 80% of a length of the latching body along a direction in which the latching body can be pushed onto the first connector body.

11. The fluid connector according to claim 10,
wherein the multiple recesses extend over more than 90% of the length of the latching body along the direction in which the latching body can be pushed onto the first connector body.

12. The fluid connector according to claim 10,
wherein the first subgroup of the first latching elements of the first latching device are adjoined to the multiple recesses which delimit the respective resilient bar.

13. The fluid connector according to claim 10,
wherein a radially outer surface of the resilient bar is arranged on a substantially identical radial extension as an outer circumferential surface of the latching body.

14. The fluid connector according to claim 10,
wherein a radially inner surface of the resilient bar is connected to the second latching element via multiple substantially radially extending connecting walls, such that the radially inner surface of the resilient bar, the multiple substantially radially extending connecting walls and the second latching element form at least one box shape.

15. The fluid connector according to claim 1,
wherein the first connector body and the second connector body have a substantially identical internal diameter which forms a respective fluid passage.

16. The fluid connector according to claim 1,
wherein the first mating latching device on the first connector body has:
  (i) projections (34) extending in a push-on direction of the latching body onto the first connector body, or
  (ii) additional recesses which are configured to engage with mating portions of the first latching device of the latching body,
such that the latching body is at least rotationally non-displaceable with respect to the first connector body.

17. The fluid connector according to claim 1,
wherein the latching body has a ring arranged radially on an inside and running concentric to a circumference of the latching body, the ring being configured to, in a connected state of the first latching device of the latching body to the first connector body, secure a seal arrangement with respect to axial displacement in relation to the first connector body, the seal arrangement being arranged on the first connector body.

* * * * *